United States Patent
Stein

(10) Patent No.: US 10,102,743 B2
(45) Date of Patent: Oct. 16, 2018

(54) STABILITY CONTROL SHARING

(71) Applicant: Bosch Automotive Service Solutions Inc., Warren, MI (US)

(72) Inventor: David Stein, Plainwell, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 191 days.

(21) Appl. No.: 14/979,792

(22) Filed: Dec. 28, 2015

(65) Prior Publication Data

US 2017/0186313 A1    Jun. 29, 2017

(51) Int. Cl.
| | |
|---|---|
| G08G 1/01 | (2006.01) |
| G01S 19/03 | (2010.01) |
| G06Q 20/08 | (2012.01) |
| H04L 29/08 | (2006.01) |
| G08G 1/0967 | (2006.01) |
| G08G 1/00 | (2006.01) |
| H04W 4/04 | (2009.01) |

(52) U.S. Cl.
CPC ............ *G08G 1/0141* (2013.01); *G01S 19/03* (2013.01); *G06Q 20/085* (2013.01); *G08G 1/0112* (2013.01); *G08G 1/0133* (2013.01); *G08G 1/096716* (2013.01); *G08G 1/096741* (2013.01); *G08G 1/096775* (2013.01); *G08G 1/20* (2013.01); *H04L 67/12* (2013.01); *H04W 4/046* (2013.01)

(58) Field of Classification Search
CPC .......... G08G 1/00; G08G 1/01; G08G 1/0104; G08G 1/0108; G08G 1/0112; G08G 1/012; G08G 1/0125; G08G 1/0133; G08G 1/0137; G08G 1/0141; G08G 1/048; G08G 1/091; G08G 1/093; G08G 1/0962; G08G 1/09626; G08G 1/0965; G08G 1/0967; G08G 1/096708; G08G 1/096766; G08G 1/096775; G08G 1/096783; G08G 1/096791; G08G 1/097; G08G 1/20; G08G 1/22; H04W 4/02; H04W 4/04; H04W 4/046
See application file for complete search history.

(56) References Cited

U.S. PATENT DOCUMENTS

| | | | |
|---|---|---|---|
| 6,263,282 B1 * | 7/2001 | Vallancourt | B60Q 1/525 340/425.5 |
| 2005/0065711 A1 * | 3/2005 | Dahlgren | G07C 5/008 701/117 |
| 2013/0141251 A1 * | 6/2013 | Sims | B60Q 9/008 340/905 |

(Continued)

*Primary Examiner* — Thomas G Black
*Assistant Examiner* — Sara J Lewandroski
(74) *Attorney, Agent, or Firm* — Baker & Hostetler LLP

(57) ABSTRACT

A system that receives and analyzes a connected vehicle's safety feature activation and the location of activation on a road to determine if a hazard condition exist and providing an alert on a subscriber's vehicle or wireless device. Weather information for the location of the activation, highway engineering information for the location of the activation and other connected vehicles' safety feature activation at the location are also considered in the determination if the hazardous condition exists on the road. The hazardous condition alert can also be sent to the highway transportation department so that the hazardous condition can be mitigated.

18 Claims, 6 Drawing Sheets

(56) References Cited

U.S. PATENT DOCUMENTS

| | | | |
|---|---|---|---|
| 2015/0039361 A1* | 2/2015 | Crowther | G06Q 10/0631 |
| | | | 705/7.12 |
| 2015/0211870 A1* | 7/2015 | Nickolaou | G01C 21/34 |
| | | | 701/28 |
| 2015/0262435 A1* | 9/2015 | Delong | G07C 5/0816 |
| | | | 340/439 |
| 2016/0133130 A1* | 5/2016 | Grimm | H04L 67/22 |
| | | | 340/905 |
| 2016/0133131 A1* | 5/2016 | Grimm | B60W 40/068 |
| | | | 701/117 |
| 2016/0171521 A1* | 6/2016 | Ramirez | G06Q 30/0224 |
| | | | 701/409 |
| 2017/0101054 A1* | 4/2017 | Dusane | G08G 1/127 |
| 2017/0169625 A1* | 6/2017 | Lavie | G07C 5/008 |
| 2017/0263120 A1* | 9/2017 | Durie, Jr. | G06F 17/30823 |

* cited by examiner

STABILITY CONTROL SHARING

FIELD OF THE INVENTION

The present invention relates generally to relaying vehicle diagnostic information. More particularly, the present invention relates to relaying safety features activation by the vehicle to third parties.

BACKGROUND OF THE INVENTION

The United States and other developed countries have a vast network of highways and roads that need to be maintained during various weather conditions. Maintenance crews often rely on weather forecasts to determine if a portion of the highway needs to be maintained during inclement weather. Maintenance during inclement weather, such as snow or sleet may include plowing, salting or sanding of the highway. Further, electronic roadway signs provide highway conditions to drivers but again rely on weather forecasts to predict if the highway is slippery in order to post a warning. Thus, there typically is a long lag time between when the highway becomes slippery and when it will get treated due to reliance on weather forecast. The lag time of the treatment may cause accidents due to the untreated slippery conditions.

Modern vehicles are equipped with various safety features including antilock brakes, lane change warnings, and stability control in order to assist drivers during the inclement weather. The safety features provide data that can be harnessed.

Accordingly, it is desirable to provide the safety features' data in real time to various third parties, such as highway transportation departments so that the highway may be treated in a timely manner during increment weather.

SUMMARY OF THE INVENTION

The foregoing needs are met, to a great extent, by the present invention, wherein in one aspect data from safety features of one or more vehicles can be relayed to third parties such as highway transportation departments so that hazardous conditions can be acted upon in real time. Additionally, drivers that may be near or at the location of the hazardous conditions can be warned via electronic messaging that includes display on electronic road signs, wireless devices, in vehicle displays and the like.

In accordance with one embodiment, a processor-implemented method of identifying hazard conditions on a road programmed in a non-transitory processor-readable medium and to execute on one or more processors of a computing device configured to execute the method that includes receiving, with a processor of the computing device, a first vehicle's safety feature activation information and a location of the activation collected from a first connected vehicle, analyzing, with the processor, the first vehicle's safety feature activation information to determine if hazard conditions exist at the location on the road being driven on by the first vehicle, storing any determined hazard conditions and location of the determined hazard conditions on a memory of the computing device, and providing, via an alert application stored on the memory, to a subscriber the determined hazard conditions and the determined hazard conditions' location.

In accordance with another embodiment, a computing device that analyzes and provides hazardous conditions alerts for a road that includes a processor configured to control functions of the computing device via software and applications, a global positioning system configured to provide a location of a subscriber in relation to a location of a determined hazardous condition on the road, a wireless interface configured to communicate with a remote device of the subscriber and to receive a first vehicle's safety feature activation information and a location of the activation collected from a first connected vehicle, and a memory in communication with the processor and configured to store an operating system and a plurality of applications, wherein the plurality of applications that includes an alert application that determines if the first vehicle's safety feature activation information indicates that the hazardous condition exists at the location on the road and provides an alert about the hazardous condition and the location of the hazardous condition to a wireless device of a subscriber, and a payment application that receives a payment of the subscriber in order to receive alerts from the alert application.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
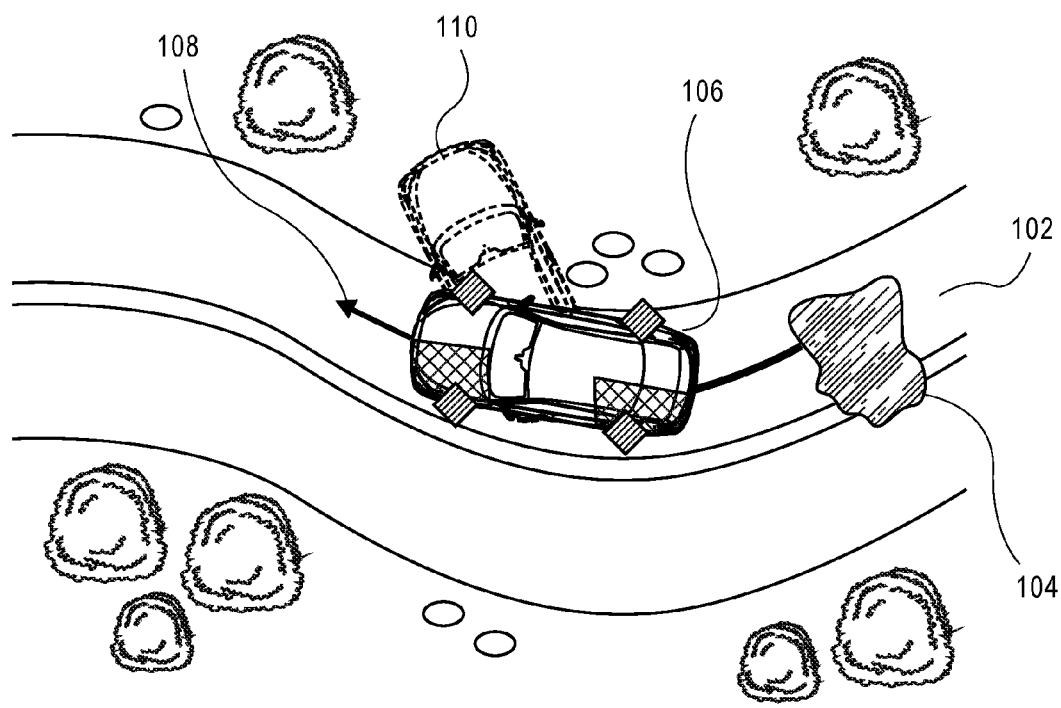
FIG. 1 illustrates a connected vehicle slipping on ice (black ice) while driving on road according to an embodiment of the invention.

The invention will now be described with reference to the drawing figures, in which like reference numerals refer to like parts throughout. Embodiments of the invention allow third parties such as the drivers and highway transportation departments to be alerted to hazardous conditions caused by weather or other reasons such as potholes, sinkholes, dangerous curves and the like.

FIG. 1 illustrates a connected vehicle 106 slipping on ice (black ice) 104 while driving on road 102 according to an embodiment of the invention. As shown in FIG. 1, the road 102 not only has a curved portion but also has ice 104 there on. Thus, the ice 104 and the curve portion on the road provide the driver of the vehicle 106 with hazardous conditions that requires the vehicle's safety features to activate. One such safety feature includes the electronic stability control on the vehicle 106.

Electronic stability control (ESC) (i.e. electronic stability program (ESP) or dynamic stability control (DSC)) is a computerized technology that improves a vehicle's stability by detecting and reducing loss of traction such as during hazardous conditions. The ESC can automatically apply the brakes individually to help "steer" the vehicle where the driver intends to go. For example, brakes may be automatically applied to the outer front wheel to counter oversteer or automatically applied to the inner rear wheel to counter understeer. ESC systems also can reduce engine power until control is regained by the driver. ESC is not designed to improve a vehicle's cornering performance, but rather, it helps to minimize the loss of control of the vehicle. Should the ESC system activate, the light 210 (FIG. 2) on the dashboard 200 (FIG. 2) will illuminate to warn the driver of its activation.

As shown in FIG. 1, when the connected vehicle 106 slips on the ice 104 on the road 102, the ESC system automatically activates, which will help the driver steer the vehicle in the direction shown by arrow 108. Otherwise, the connected vehicle 106 will veer off the road 102 as shown by the vehicle 110. Other safety features that may be activated include the lane change warnings and anti-lock braking. When the safety features of the vehicle are activated, data related to such activation may be stored in an electronic control unit of the vehicle or in the computer system/entertainment system (310 of FIG. 3). The data may include information such as duration of activation, number of times of activation, actions taken (braking, lane change, over steering, etc.), time and location of such activation and the like. The safety features activation data may be stored locally on the vehicle or relayed to third parties via the vehicle's entertainment system 310 (FIG. 3) or a wireless device 312 (FIG. 3) of the driver or the passenger.

Figure 2:
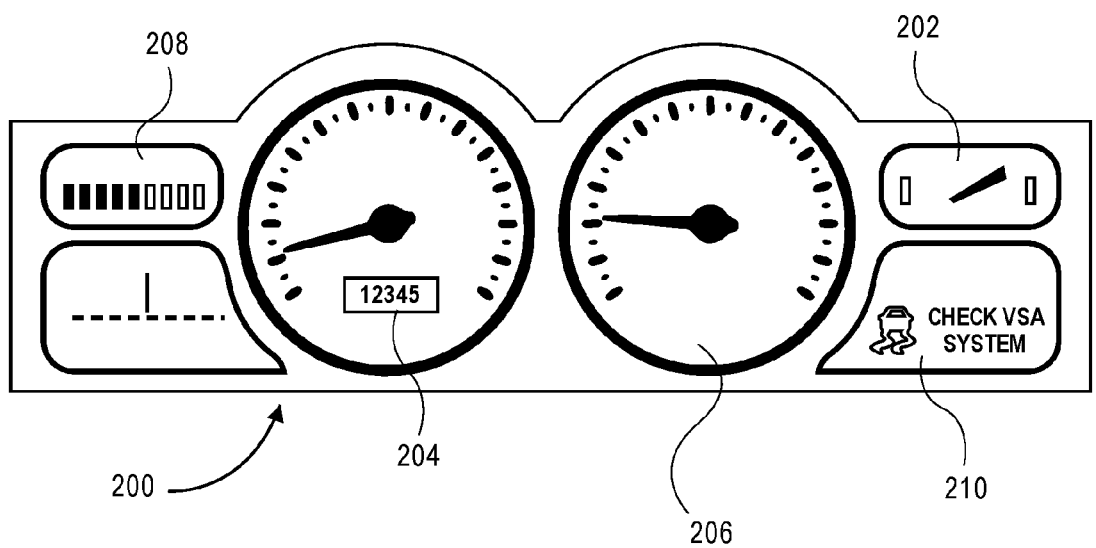
FIG. 2 illustrates an exemplary dashboard of a connected vehicle according to an embodiment of the invention.

FIG. 2 illustrates an exemplary dashboard 200 of a connected vehicle 106 according to an embodiment of the invention. The dashboard 200 or the instrument panel may include a fuel gauge 202, an odometer 204, a speedometer 206, battery status 208, ESC light 210 and the like. The ECS light 210 and other warning indicators such as lane change warnings and anti-lock braking are typically illuminated upon that safety feature's activation. In other embodiments, dashboard 200 includes a display 408 (FIG. 4) to display information such as nearby hazardous conditions.

Figure 3:
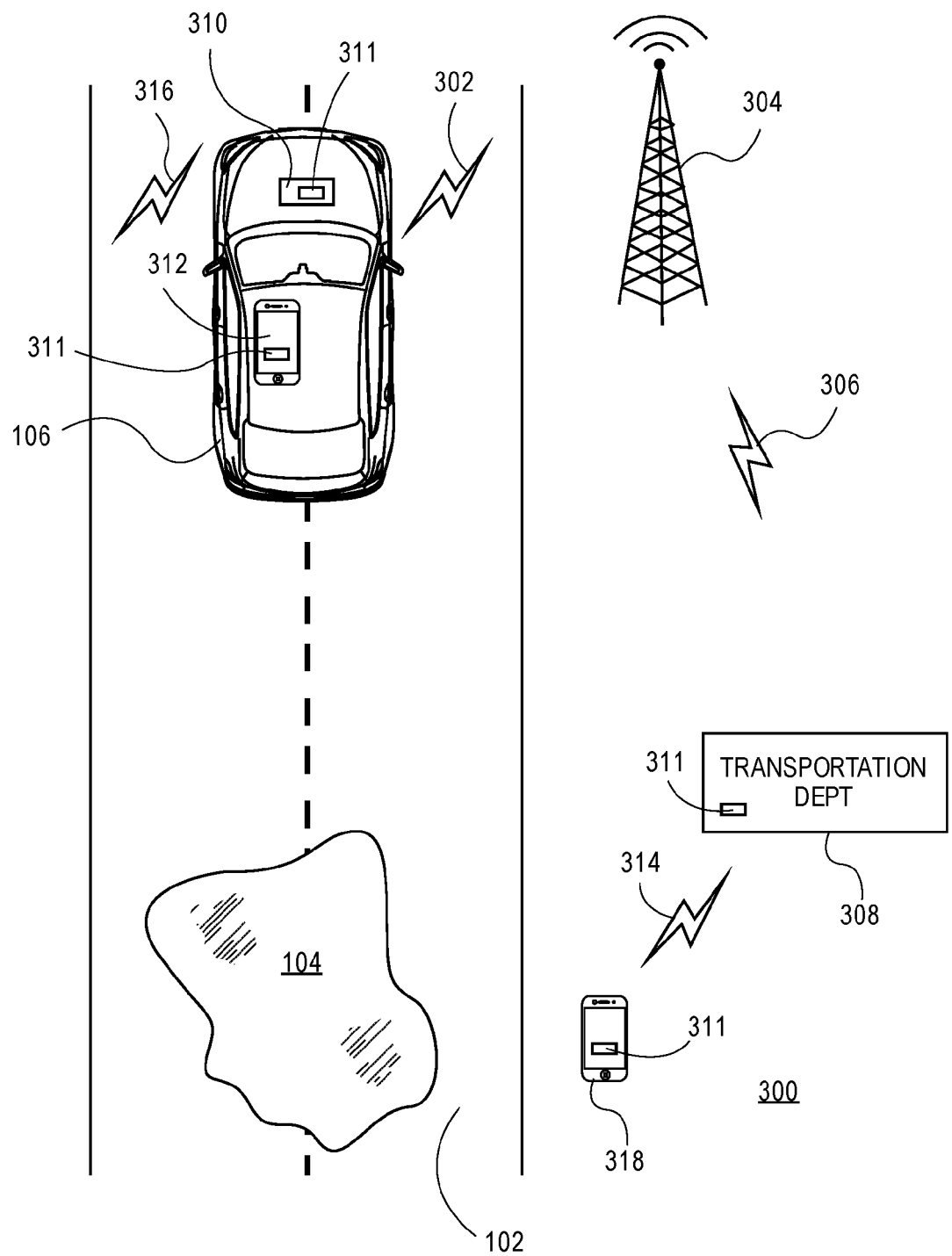
FIG. 3 illustrates the connected vehicle communicating with a communication tower and a highway transportation department according to an embodiment of the invention.

FIG. 3 illustrates the connected vehicle 106 communicating with the communication tower 304 and a highway transportation department 308 according to an embodiment of the invention. A connected vehicle 106 is capable of communicating with a third-party such as the highway transportation department 308, other connected vehicles 406, 410 (FIG. 4) or wireless devices 312, 318 such as a smart phone, personal digital assistant, videogame console, smart glasses, smart watch, tablet, laptop and the like.

Figure 5:
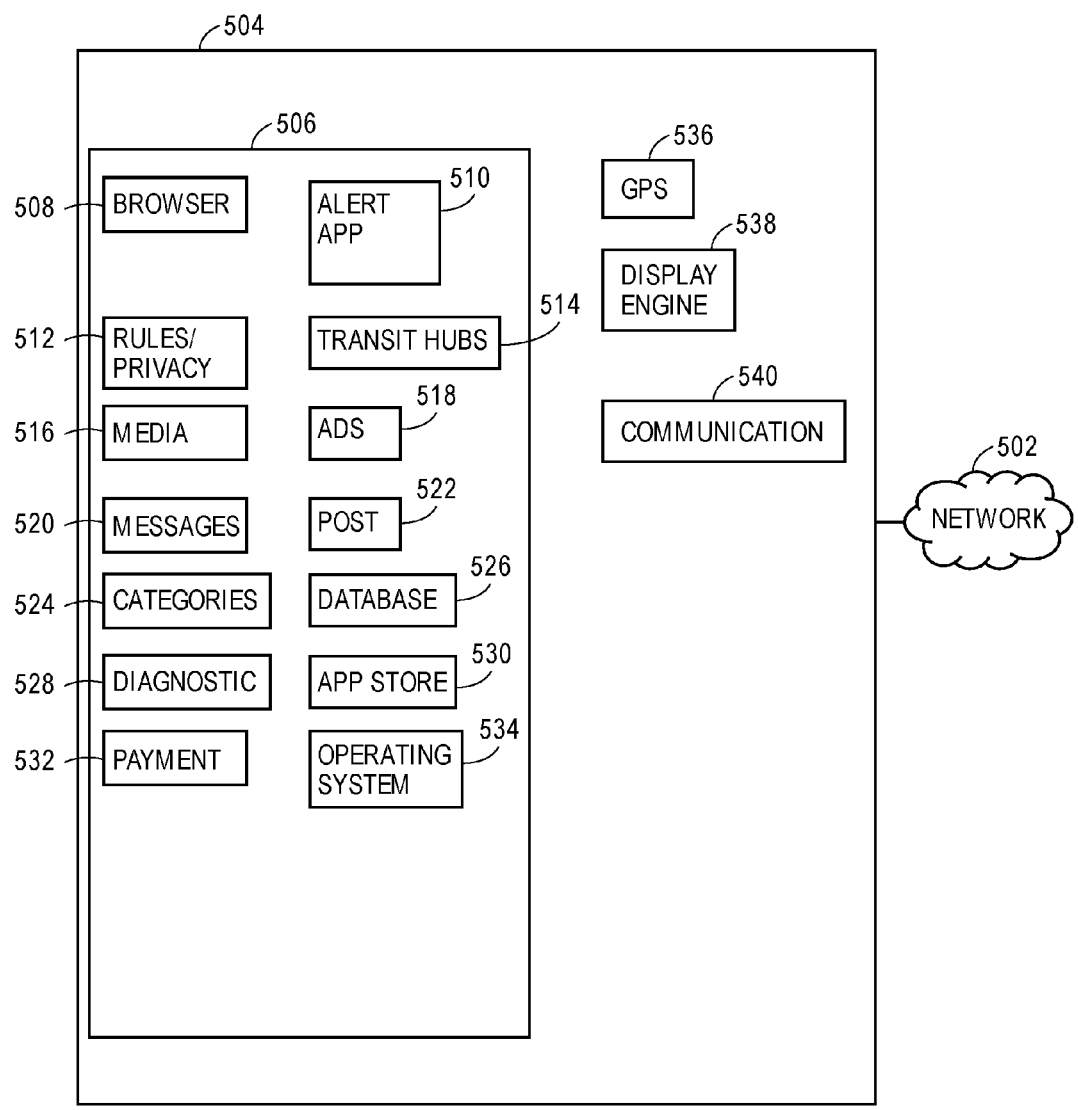
FIG. 5 illustrates exemplary components of a network system according to an embodiment of the invention.

In one embodiment, the connected vehicles 106, 406, 410, the wireless devices 312, 318, the highway transportation department 308 may store an alert app 311 that receives alerts from a server 506 (FIG. 5). The alert app 311 may be provided as a free service (and may contains ads), one-time purchase or subscription based (daily, weekly, monthly, quarterly, half-year, yearly, etc.) and the like. The alert app 311 is configured to provide the safety features activation and related data of the activation to the server 506, other connected vehicles 406, 410, highway transportation department 308, other third parties 416 (radio station, weather stations, etc.) or receive reports or alerts about the hazardous conditions including the location and type of hazardous conditions (snow, rain, sleet, curved road, etc.). In other embodiments, the alert app can perform all the functionality that are done by server 506 discussed herein.

The entertainment system 310 may include components such as the wireless interface to communicate wirelessly using standard or proprietary communication protocols via a connection 302 (wired or wireless connection), a display (408 of FIG. 4), a processor, associated memory and clock, software, a global positioning system (GPS) and the like. The GPS may provide the time and location of the safety features activation in the connected vehicle 106.

In one embodiment, connection 302 is a wireless connection that communicates with a communication tower 304, a satellite (not shown) or directly to the third parties such as the highway transportation department 308, other wireless devices 312, 318, electronic road signs 404, other third parties 416 and the like. In another embodiment, the connected vehicle 106 may communicate with a network 502 (FIG. 5), which may be the Internet, other distributed network, WLAN, LAN, and the like. It should be noted that the various connections 302, 306, 314, 316 may be the same or different type of connection (wired or wireless) from each other. Wired connections may include USB (universal serial bus), FireWire, serial, parallel and the like while wireless connections may be via Wi-Fi, Bluetooth, Zigbee, near field communications, radiofrequency, satellite, cellular and the like.

In one embodiment, during or after the activation of the safety features of the connected vehicle 106, the connected vehicle and/or a wireless device 312 of the driver and passenger may communicate, using the alert application 311, the safety features activation and related data of the activation via connection 302 to the communication tower 304 or other computing devices described herein. The communication tower 304 may instantaneously or simultaneously transmit the safety features activation and related data of the activation via connection 306 to the highway transportation department 308. In other embodiments, the connected vehicle 106 and/or wireless device 312 communicate directly with the highway transportation department 308, other connected vehicles 406, 410, electronic road signs 404, other wireless device 318 and the like via connection 302, 316.

At the transportation department 308 (and/or at server 504), the safety features activation and related data of the activation may be analyzed to determine if a portion of the highway where the safety features activation occurred warrants maintenance or treatment by the highway maintenance crew and if warnings or alerts should be sent to other connected vehicles, additional third parties (radio stations, traffic website provider and the like) 416, electronic road signs 404, wireless device 318, and the like. The determination by the transportation department 308 may include similar activation information from other connected vehicles, and weather related information such as from the national weather service and the like. That is, the determination by the highway transportation department 308 can be done with data from one connected vehicle, multiple connected vehicles, and/or weather-related sources. As more connected vehicles 406, 410 provide similar safety features activation, the more likelihood that hazardous conditions have occurred. In other embodiments, information from highway database may also provide that in that curved section of road 102, water tends to pool as there is a dip in that portion of the road in relation to other parts of the road and coupled with an inclement weather forecast and reporting of the safety features activation, a determination may be made that hazardous conditions are likely present in that portion of the road 102. Thus, other drivers may be alerted to the location of a hazardous condition so that appropriate actions may be taken. For example, the owner of the wireless device 318 may delay traveling until the hazard conditions have been mitigated or simply work from home.

In one embodiment, the wireless device 312 can receive information about the safety features activation and related data of the activation via communication with the electronic control unit via the wireless adapter connected thereto. The wireless adapter may be the U-Scan™ from Bosch Automotive Service Solutions Inc., located in Warren Mich. The wireless device 312 also includes components such as a display, wireless interface (e.g. cellular, Wi-Fi), a processor, associated memory, software, alert app 311, GPS and the like. Thus, the wireless device 312 is configured to transmit the safety features activation and related data of the activation to third parties via connection 316 to the communication tower 304, the transportation department 308, other connected vehicles 406, 410, electronic road signs 404, other wireless device 318, other third parties 416 and the like. In other embodiments, either the connected vehicle 106 or wireless device 312 alone or together can relay the safety features activation and the related data to third parties.

Figure 4:
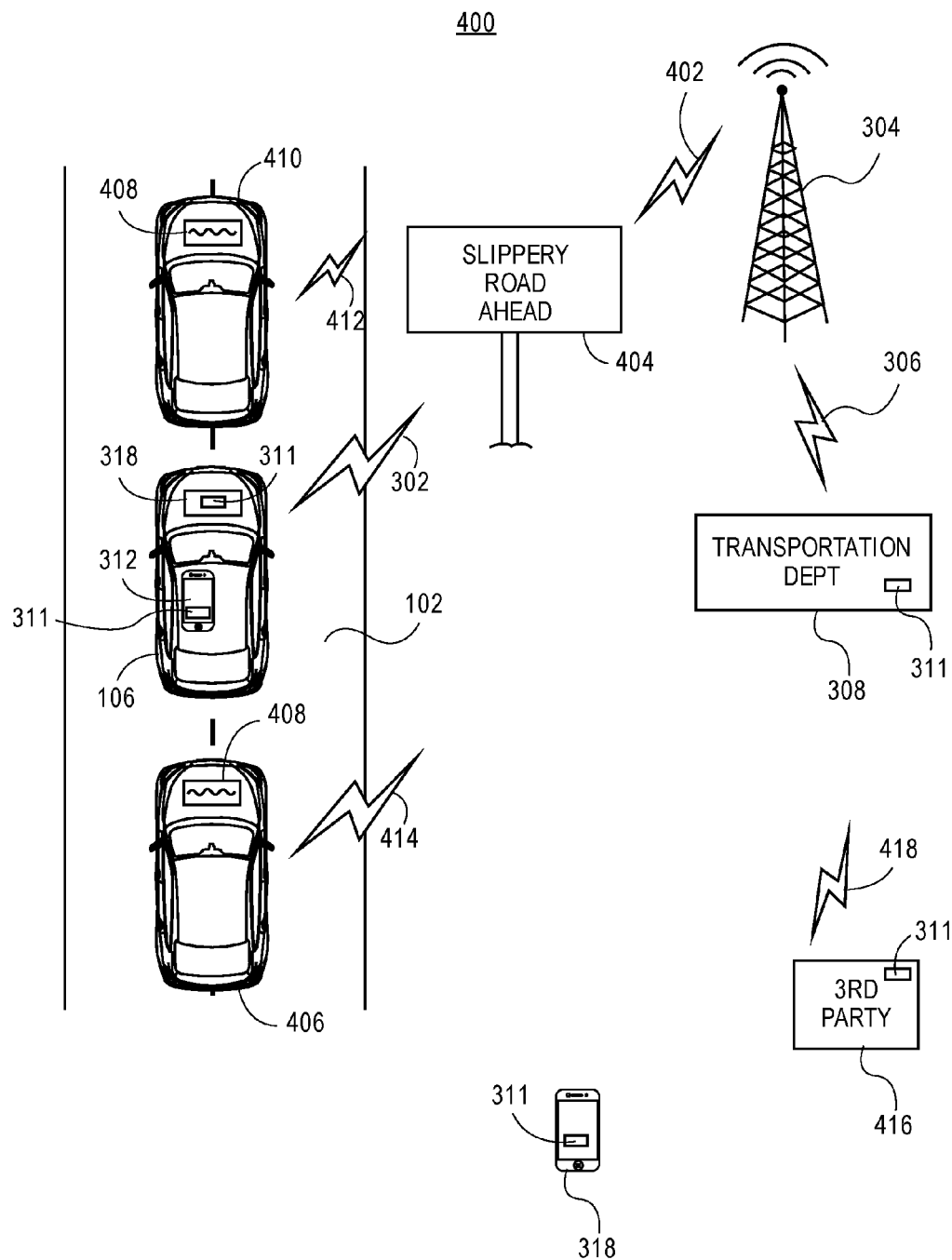
FIG. 4 illustrates a system to convey the hazardous conditions on the road according to an embodiment of the invention.

FIG. 4 illustrates a system 400 to convey the hazardous condition on the road 102 according to an embodiment of the invention. The system 400 may contain one or more of the following components: the connected vehicle 106, wireless device 312, other connected vehicles 406, 410, the communication tower 304, the transportation department 308, wireless device 318, electronic road sign 404, other third parties 416 and respective connections 302, 306, 402, 412, 414, 418 may be the same or different type of connection (wired or wireless) from each other.

As stated above, the connected vehicle 106 and/or wireless device 312 may relay via connection 302, 312 information about the safety features activation and related data to the safety features that indirectly indicate the hazardous condition on the road 102. Similarly, other connected vehicles 406, 410 may also provide similar information. The connection 302 may communicate directly with other connected vehicles 406, 410, electronic road sign 404, the communication tower 304, the highway transportation department 308, other third parties 416 and/or wireless device 318. At the highway transportation department 308 (or other third parties 416, etc.), the safety features activation and related data of the activation may be analyzed to determine if a portion of the highway where the safety features activation occurred warrants maintenance or treatment by the highway maintenance crew and if warnings should be sent to other connected vehicles 406, 410 (on display 408), additional third parties (radio stations, traffic websites, weather stations, and the like) 416, electronic road signs 404, wireless device 318 and the like.

Electronic road signs 404 are positioned at various locations along the road 102 and include wireless interface to communicate with other computing devices. For example, electronic road signs 404 may display "slippery road ahead" or any other information desired. Entertainment systems 310 or dashboard 200 may include display 408 in order to display information such as "slippery road ahead" or any other desired information. Alternatively, the driver or passenger may receive similar information on her wireless device 312.

The system for conveying hazardous conditions on the highway uses safety features activation and related data of the activation including the location of activation in order to provide, in real-time, the hazardous conditions to other third parties. The system can be configured to manually (by driver or passenger) or automatically transmit the safety features activation and related data of the activation to the third parties. It also can help highway engineers redesign a stretch or road that is known to have a curve or other features that require safety features activation on a daily basis on multiple connected vehicles.

FIG. 5 illustrates exemplary components of network system 500 according to an embodiment of the invention. The network system 500 includes the network 502 and the server 504. The network system 500 may be located at any third party such as the highway transportation department, weather stations, radio stations, traffic websites and the like. Further, the functions of the server may be performed on any computing device. Major hardware components of the server such as processor, power source, interfaces (input/output), other memories and components that are part of the server 504 are not shown but are known in the art. Network 502 may be any type of network such as Wi-Fi, LAN (local area network), WAN (wide area network), cellular, satellite, zigbee, SAN (storage area network), PAN, (personal area network), MAN (metropolitan area network), Internet or a distributed network and the like.

Memory 506 may store various information, formulas, images, objects, data, applications, software, maps, diagrams, and the like. The applications that may be stored in the memory 506 include Browser Manager 508, Alert Manager 510, Rules/Privacy Manager 512, Transit Hubs Manager 514, Media/Content Manager 516, Ads Generator 518, Messages Manager 520, Post Manager 522, Categories Manager 524, Database 526, Diagnostic Manager 528, App Store 530, and Payment Manager 532. Other applications may also be stored to practice the embodiments of the invention. These applications/managers may interact with each other in order to function properly or for their configured purpose. An operating system 534 is also stored in memory 506.

Further, these applications can also interact with an alert app 311 that are stored on the entertainment system 310 of the connected vehicle 106 or on the wireless devices 312, 318 or computing devices of third parties 308, 416 so that the desired functions and operations described herein can be utilized on the wireless devices 312, 318, electronic road signs 404, and/or the connected vehicle 106 and the like.

Browser Manager 508 interacts with the browsers used by computing devices such as wireless devices 312, 318 or connected vehicles 106, 406, 410 that include Apple Safari, Microsoft Explorer or Edge, Google Chrome and the like and also interacts with the various applications discussed herein. The Browser Manager 508 allows the driver or passenger and/or the server (third parties, transportation department, radio stations, weather centers, etc.) owner to perform operations such as controlling the browser content including posting or alerting of hazardous conditions, posting, messaging, multimedia content and the like. The Browser Manager 508 may interact with the Alert Manager 510 in order to provide the user or subscriber with the desired experience.

Alert Manager 510 can control or catalog the multitude of subscribers, users, consumers, passengers, drivers, vehicles, and other third parties (and their respective images and information) including log-in information, location of the subscribers such as users, consumers, drivers and vehicles, preferences (mailing, routes taken, settings, purchases, etc.), payment information, physical addresses, and virtual addresses such as emails, phone numbers and the like. This allows the Alert Manager to push the alerts such as emails, postings, messaging, social media (Facebook, Twitter) and the like regarding hazardous conditions along a proposed route (i.e. route using Google Maps™ or Waze™, etc.) out to the users of the alert app 311.

Rules/Privacy Manager 512 may control the various rules settings of the website of the server's owner (or the owner of the website) including controlling different privacy levels set by the user or settings imposed by the website's owner. Transit Hubs Manager 514 can manage information about the various transit hubs or third parties (or data subscribers) such as department of transportations, weather centers, ration stations, toll road owners, including their location in various cities, services subscribed or provided, contact information of the transit hubs such as addresses, emails, phone numbers, webpages, other social media sites, and the like.

Media Manager 516 can control the multimedia information (how to drive through a particular type of hazards, visitor information, nearby restaurants, stores, hotels, repair shops, etc.) may be uploaded or downloaded to the user or rider to make the driving experience more enjoyable and help the driver to get to his desired destination. Multimedia information may include links, news, video files, photographs, audio files (music, sound, etc.) and the like. Ads Generator 518 may control the various ads that may be present on the website or on the alert app 311 including their placement in terms of position and timing. For example, Ads Generator 518 may push ads related to snow tires or snow chains in the event that snow or icing hazardous conditions are determined. Messages Manager 520 can control the various messages that are being posted and responded to by the various users. Messages Manager 520 may also be a "messenger" system that is separate from the website so that subscribers, users, drivers, passengers, or other third parties may communicate with each other. By having the "messenger" system separate from the website, this helps to control amount of information that is being processed by the transit hub's website at any given time and may allow for faster real-time messaging to occur.

Post Manager 522 can control posting by the subscribers including formatting the posting, length of the posting, moderating the posting, controlling who can post or reply to the posting, and the like. Posts can be posted on a virtual blackboard for the transit hub. Categories Manager 524 can control various categories that are displayed on the website or in the alert app 311. Categories may include notifications, interests, apps, nearby friends, stores, restaurants, events, and the like.

Database 526 can be used to store various information and data including pictures, images, software, maps, media files (video and audio), subscriber information, diagnostic information, hazardous conditions information, user information, highway engineering information, posting information, messaging information, transit hub information, rules information, weather information, setting information, ads information, categories information, application information, browser information, location information, payment information, and the like. Database 526 may also be accessed via the network 502 by the wireless devices 312, 318, the connected vehicles 106, 406, 410 or other external computing devices (transportation department, third parties, etc.). Database 526 can also access other remote databases via the network 502.

Diagnostic Manager 528 can receive and analyze various diagnostic information such as safety features activation, and related data of the activation, diagnostic trouble codes (DTCs), other vehicle diagnostics of the connected vehicle 106 or other devices the wireless device 312, 318 and the like. Diagnostic manager 326 can also interact with wireless devices 312, 318 to receive safety features activation and related data of the activation or diagnose vehicles such as the connected vehicles 106, 406, 410. The Diagnostic Manager 528 may analyze the safety features activation, and related data of the activation from multiple vehicles, weather related conditions and highway engineering information to determine if hazardous conditions exist on the road 102.

App Store 530 can control various apps that can be downloaded to devices such as the wireless devices 312, 318 or the connected vehicles 106, 406, 410. Examples of the App Store 530 include Google Play and Apple App Store and the like. Payment Manager 330 allows the subscriber or user to pay for subscription to receive services such as hazardous conditions alerts or other services (physically or virtually) either by entering their own credit card, debit card, gift card and discount codes or interacting with other pay services such as PayPal, Apple pay, Google pay and the like. The Payment Manager can store credit card, debit card, gift card, discount codes, contact information (addresses, phone numbers, emails, etc.) and the like. Operating system 534 stored in the memory can include Apple iOS, Google Android, Windows 10, Linux and the like. It should be noted that although these managers/apps are discussed individually, one or more functionality may be combined into one app instead of being separated.

Other components for server 504 can include GPS System 536, display engine 538, and communication interface 540. GPS system 340 can track the various locations of the transit hubs 514, vehicles 106, 406, 410, wireless devices 312, 318, subscribers, drivers, users, and riders and provide their locations in relation to the hazardous conditions or to each other. Display engine or graphical user interface (GUI) generator 538 can control display of information on the display of the wireless devices 311, 318 or the display 408 of the connected vehicles 106, 406, 410. For example, GUI generator 538 can control various parts of the browser or alert app 311, 510 such as hazardous conditions on a map, subscriber profile information, postings, multimedia content and the like. Further, GUI generator 538 can also interpret the interactions by the user of the wireless devices 312, 318 or of the connected vehicles 106, 406, 410 so that requested information or received information is properly processed. Communication interface 540 allows for wired or wireless communication between the server and its components and the network 502. Wired connection may be USB, FireWire, serial, parallel and the like. Wireless communication may include Wi-Fi, Bluetooth, Zigbee, near field communications, radiofrequency, satellite, cellular and the like.

Figure 6:
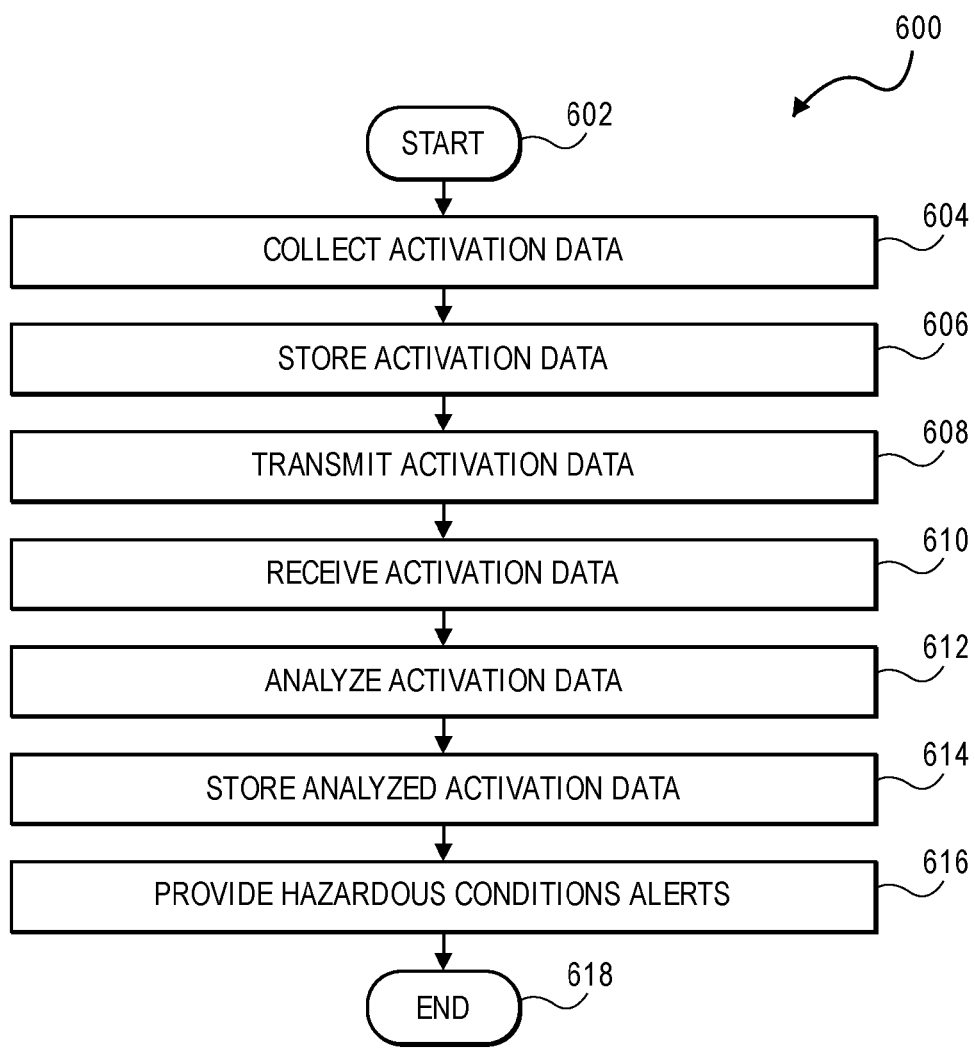
FIG. 6 illustrates a method for reporting and receiving hazardous conditions information according to an embodiment of the invention.

FIG. 6 illustrates a method 600 for reporting and receiving hazardous conditions information. The method 600 may be implemented using the various components described herein. At step 602, the method 600 starts and proceeds to step 604. At step 604, the connected vehicle 106 collects driving data such as safety features activation, and related data of the activation, and/or diagnostic information. Safety features activation may include ESC, lane change warnings, and/or anti-lock braking activation due to hazardous conditions on the road. Driving data may also include GPS location of the vehicle/driver to determine the location of the hazardous conditions.

At step 606, the driving data including the safety features activation and related data of the activation (including location) may be stored in a memory 506, database 526, Alert Manager 510 or the Diagnostic Manager 528. At step 608, the stored driving data including the safety features activation, and related data of the activation may be transmitted (continuously or intermittently) to server 504 (or other devices discussed herein) if it was stored on the connected vehicle 106 or the wireless device 312. The driving data including the safety features activation, and related data of the activation (including location) may be transmitted from the connected vehicle 106 or the wireless device 312 via the communication tower 304 or directly to the server 504 via connection 302, 316. At step 610, the server 504 receives the transmitted stored driving data including the safety features activation, and related data of the activation, weather information, and/or highway engineering information and stores it in the database 526, Alert Manager 510 or the Diagnostic Manager 528 of memory 506.

At step 612, Alert Manager 510 or the Diagnostic Manager 528 analyzes the driving data (including the safety features activation, and related data of the activation), weather data for the location of the activation, highway engineering data for the location of activation and the like to determine if based on one or more of the driving data, weather information, highway engineering information whether hazardous conditions exist at a location of the road 102. Location of the vehicle and driver/passenger can also be taken into account as part of the analysis. The analyzing step may be intermittent, for example every five minutes, 30 minutes, every hour, every 5 hours, every 24 hours, every other day, every week and the like or the analyzing step may be continuous or on the fly.

At step 614, the analyzed driving/activation data, weather and highway information and any determinations of hazardous conditions can be stored on the server 504 (e.g. database 526, Alert Manager 510 or Diagnostic Manager 528). At step 616, the Alert Manager 510 can provide hazardous condition alerts to subscribers including other connected vehicles 406, 410 (on display 408), highway transportation departments 308, additional third parties (radio stations, traffic websites, weather stations, and the like) 416, electronic road signs 404, wireless device 318 and the like through alert app 311 and/or via browsers, emails, postings, messaging, social media (Facebook, Twitter) etc. At step 618, the method ends.

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions that include routines, programs, objects, components, data structures, and so on, that perform particular tasks or implement particular abstract data types. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks. Additionally, the steps in the flow chart do not have to be performed in the order set forth but can be in any order and be implemented by other components than the ones described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A processor-implemented method of identifying hazard conditions on a road, the method programmed in a non-transitory processor-readable medium and to execute on one or more processors of a computing device configured to execute the method, comprising:
    receiving, with a processor of the computing device, a first safety feature activation information of a first connected vehicle being driven on the road, and a location on the road of a first safety feature activation, wherein the first safety feature activation information includes a duration of the first safety feature activation, number of first safety feature activations that occurred on the road, actions taken by a driver of the first connected vehicle and a time of the first safety feature activation;
    analyzing, with the processor, the first safety feature activation information of the first connected vehicle to determine if hazard conditions exist at the location on the road being driven on by the first connected vehicle;
    storing the determined hazard conditions and location of the determined hazard conditions and first safety feature activation information on a memory of the computing device; and
    providing, via an alert application stored on the memory, to a subscriber the determined hazard conditions and the location of the determined hazard conditions, and wherein the alert application further provides the determined hazard conditions and location to an electronic road sign located near the location of the hazard conditions.

2. The identifying method of claim 1, wherein the alert application provides the determined hazard conditions and location along a route driven by the subscriber.

3. The identifying method of claim 1, wherein the first safety feature activation is selected from a group consisting of lane change warnings, anti-lock braking and electronic stability control.

4. The identifying method of claim 1 further comprising:
    receiving weather information for the location of the first safety feature activation or highway engineering information for the location of the first safety feature activation.

5. The identifying method of claim 4, wherein the analyzing step uses weather information for the location of the first safety feature activation or highway engineering information for the location of the first safety feature activation in addition to the first safety feature activation information of the first connected vehicle to determine if the hazardous conditions exist for that location of the road.

6. The identifying method of claim 1 further comprising:
receiving, with the processor of the computing device, a second safety feature activation information of a second connected vehicle that was collected at the location of the first safety feature activation; and
analyzing the second safety feature activation information of the second vehicle with the processor in addition to the first safety feature activation information of the first connected vehicle to determine if hazard conditions exist at the location on the road being driven on by the first and second connected vehicles.

7. The identifying method of claim 1, wherein the subscriber is a highway transportation department, a driver of the first connected vehicle or a passenger of the first connected vehicle.

8. The identifying method of claim 1, wherein the subscriber is a weather station, a radio station or a web traffic provider.

9. The identifying method of claim 1, wherein the alert application further provides the determined hazard conditions and location to a display of a second connected vehicle.

10. A computing device that analyzes and provides hazardous conditions alerts for a road, comprising:
a processor configured to control functions of the computing device via software and a plurality of applications;
a global positioning system configured to provide a location of a subscriber in relation to a location of a determined hazardous condition on the road;
a wireless interface configured to communicate with a remote device of the subscriber and to receive a first safety feature activation information of a first connected vehicle being driven on the road and a location on the road of a first safety feature activation; and
a memory in communication with the processor and configured to store an operating system and the plurality of applications, wherein the plurality of applications comprising:
an alert application that determines if the first safety feature activation information indicates that the hazardous condition exists at the location on the road and provides an alert about the hazardous condition and the location of the hazardous condition to the remote device of the subscriber, wherein the first safety feature activation information includes duration of the first safety feature activation, number of first safety feature activations, actions taken by a driver of the first connected vehicle and a time of the first safety feature activation, and wherein the alert application further provides the determined hazard conditions and location to an electronic road sign located near the location of the hazard conditions; and
a payment application that receives a payment of the subscriber in order to receive alerts from the alert application.

11. The computing device of claim 10, wherein the alert application further provides the determined hazard conditions and location to a display of a second connected vehicle.

12. The computing device of claim 10, wherein the alert is an email, a posting, or an instant message that is received on the remote device of the subscriber.

13. The computing device of claim 10, wherein the wireless interface further configured to receive a second safety feature activation information of a second connected vehicle at the location of the first safety feature activation.

14. The computing device of claim 13, wherein the alert application further determines if the second safety feature activation information in addition to the first safety feature activation information indicate that the hazardous condition exists at the location on the road and provides the alert about the hazardous condition and the location of the hazardous condition to the remote device of the subscriber.

15. The computing device of claim 10, wherein the first safety feature is selected from a group consisting of lane change warnings, anti-lock braking and electronic stability control.

16. The computing device of claim 10, wherein the wireless interface further configured to receive weather information for the location of the first safety feature activation or highway engineering information for the location of the first safety feature activation.

17. The computing device of claim 16, wherein the alert application further determines if the first safety feature activation information in addition to the weather information or highway engineering information indicate that the hazardous condition exists at the location on the road.

18. The computing device of claim 10, wherein the subscriber is a highway transportation department, a driver of the first connected vehicle or a passenger of the first connected vehicle.

* * * * *